US009836514B2

(12) United States Patent
Kruglick

(10) Patent No.: US 9,836,514 B2
(45) Date of Patent: Dec. 5, 2017

(54) CACHE BASED KEY-VALUE STORE MAPPING AND REPLICATION

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 590 days.

(21) Appl. No.: 13/502,312

(22) PCT Filed: Nov. 7, 2011

(86) PCT No.: PCT/US2011/059553
§ 371 (c)(1),
(2), (4) Date: Apr. 16, 2012

(87) PCT Pub. No.: WO2013/070185
PCT Pub. Date: May 16, 2013

(65) Prior Publication Data
US 2013/0117227 A1    May 9, 2013

(51) Int. Cl.
*G06F 17/30* (2006.01)
*G06F 7/00* (2006.01)

(52) U.S. Cl.
CPC .............................. *G06F 17/30575* (2013.01)

(58) Field of Classification Search
CPC ................................................. G06F 2213/00
See application file for complete search history.

(56) References Cited

U.S. PATENT DOCUMENTS

| 5,146,578 | A | * | 9/1992 | Zangenehpour | .... G06F 12/0862 711/122 |
| 5,319,395 | A | * | 6/1994 | Larky et al. | .................. 345/605 |
| 6,256,635 | B1 | * | 7/2001 | Arrouye | ............. G06F 9/44505 |
| 7,620,665 | B1 | | 11/2009 | George et al. | |

(Continued)

FOREIGN PATENT DOCUMENTS

| CN | 101593202 A | 12/2009 |
| CN | 102117338 | 4/2011 |

OTHER PUBLICATIONS

Chang, et al., "Bigtable: A distributed storage system for structured data," ACM Transactions on Computer Systems (TOCS) 26, No. 2 (2008): 14 pages.

(Continued)

*Primary Examiner* — Mariela Reyes
*Assistant Examiner* — Jermaine Mincey
(74) *Attorney, Agent, or Firm* — Turk IP Law, LLC

(57) ABSTRACT

Technologies are generally described for cache based key-value store mapping and replication. In some examples, key-value stores may be mapped for data structure replication through extraction of file breaks in an existing key-value store by iterating through the store and examining changes in cache addresses to detect jumps in address values. Specially formulated queries may be executed to return the values within an address range that spans a physical storage volume in order to recover full key-value sets that are physically grouped at a current data center including record duplicates. Such sets may be used to (Continued)

replicate or inform the key-value sets at a new location or in a new key-value store allowing construction of a replicated database tree structure complete with record duplications that develop as tables are optimized over time.

13 Claims, 6 Drawing Sheets

(56) References Cited

U.S. PATENT DOCUMENTS

| | | |
|---|---|---|
| 2004/0181558 A1 | 9/2004 | Williams et al. |
| 2007/0271394 A1* | 11/2007 | Pauly et al. ............... 709/246 |
| 2008/0065590 A1* | 3/2008 | Castro et al. .................. 707/2 |
| 2010/0110935 A1* | 5/2010 | Tamassia ............. H04L 63/12 370/256 |
| 2010/0332456 A1 | 12/2010 | Prahlad et al. |
| 2011/0072006 A1* | 3/2011 | Yu et al. ................... 707/718 |
| 2011/0099154 A1* | 4/2011 | Maydew ........ G06F 17/30156 707/692 |
| 2011/0137973 A1* | 6/2011 | Wei ................. H04L 67/1008 709/202 |
| 2011/0196866 A1 | 8/2011 | Cooper |
| 2013/0198854 A1* | 8/2013 | Erway ................. H04L 9/008 726/27 |

OTHER PUBLICATIONS

Auto Scaling Developer Guide; API Version Jan. 1, 2011; Amazon Web Services; Copyright © 2012 Amazon Web Services, LLC.; 85 pages http://docs.amazonwebservices.com/sdkfornet/latest/apidocs/html/P_Amazon_AutoScaling_Model_DescribeLaunchConfigurationsRequest_NextToken.htm.

International Search Report and Written Opinion PCT/2011/59553 dated Mar. 19, 2012.

International Preliminary Report on Patentability for PCT/US2011/059553 filed Nov. 7, 2011, dated May 22, 2014, issued May 13, 2014.

Habeeb, M., "A Developers Guide to Amazon Simple DB" Programmers Selection, First Edition, pp. 145-153 (Mar. 10, 2011).

\* cited by examiner

CACHE BASED KEY-VALUE STORE MAPPING AND REPLICATION

CROSS-REFERENCE TO RELATED APPLICATION

This Application is the U.S. National Stage filing under 35 U.S.C. §371 of International Application No. PCT/US2011/059553 filed on Nov. 7, 2011. The International application is hereby incorporated by reference in its entirety.

BACKGROUND

Unless otherwise indicated herein, the materials described in this section are not prior art to the claims in this application and are not admitted to be prior art by inclusion in this section.

Cloud service providers typically do not support conventional database management systems (DBMS); rather they provide a key-value store service that a user can access via Application Programming Interface (API) commands. The reason for this approach is because DBMSs are not easily scaled and do not cope well with failures or network uncertainty—both keystone infrastructure assumptions for service oriented architectures (SOA). Once users translate their data to data centers, maintaining database performance after moving data between data centers involves replication of key-value stores including complex tree structure and data recurrences (duplication) that the original data center may have generated using long periods of operational observation. For replicating such structures at a destination data center, the division boundaries of storage for the user tables and where duplicate records are used may need to be known. This is information that is abstracted away from user access in data centers.

Key-value stores typically include hidden layers. User data tables may be split across many machines and have multiple levels of metadata trees above each table to find the location of each key-value. The key-value stores are commonly proprietary to each data center service provider and may be accessible to the users through API calls, where users can provide keys or matching terms and retrieve the values. The actual structure of the metadata tables or user data tables may not be visible to the user, although some details may need to be replicated at a destination data center if database performance is to be maintained.

In conventional systems, a user does not have access to the actual files in which the key-value store is physically stored. The key-value files are part of the data center service structure and if one wishes to move a customer to a new data center, it is unlikely that the current data center may dedicate technicians to the act of retrieving these deeply integrated data stores which are spread among machines in a proprietary fashion, contain optimizations developed by the current data center, and use proprietary file formats.

SUMMARY

The present disclosure generally describes technologies for key-value store mapping and replication of data storage structures in data centers. According to some examples, a method for key-value store mapping and replication may include mapping physical storage distribution within a target data center by extracting relative data storage locations employing data query caches from a key-value store of the target data center and mapping data divisions and data duplication within the target data center. The method may also include replicating data within the target data center to similar structures in a new data center.

According to other examples, a computing device adapted to perform key-value store mapping and replication may include a memory and a processor coupled to the memory. The processor may execute a data transfer application, which may map physical storage distribution within a target data center by extracting relative data storage locations employing data query caches from a key-value store of the target data center, map data divisions and data duplication within the target data center, and replicate data within the target data center to similar structures in a new data center.

According to further examples, a computer-readable storage medium may have instructions stored thereon for key-value store mapping and replication. The instructions may include mapping physical storage distribution within a target data center by extracting relative data storage locations employing data query caches from a key-value store of the target data center; mapping data divisions and data duplication within the target data center; and replicating data within the target data center to similar structures in a new data center.

According to yet other examples, a server adapted to perform key-value store mapping and replication may include a memory and a processor coupled to the memory. The processor may execute a data transfer application, which may be configured to extract file breaks in an existing key-value store of a target data center by iteratively submitting a query requesting a predefined number of results and a location cache element to the key-value store of the target data center; receive return values within an address range that spans a physical storage volume; and recover key-value sets and record duplicates that are physically grouped at the target data center.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
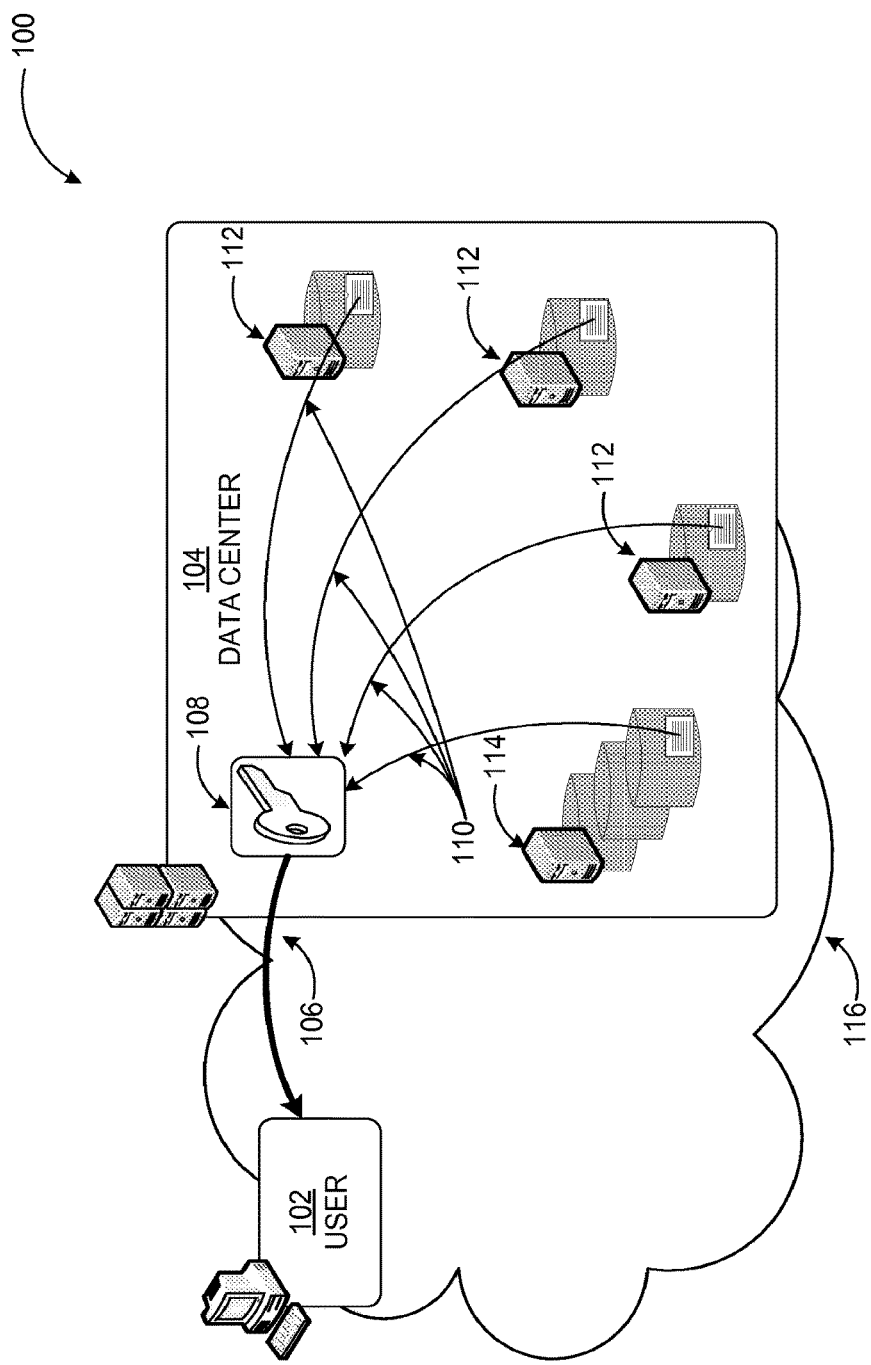
FIG. 1 conceptually illustrates a cloud-based data center storing user data across multiple data stores and servers.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to cache based key-value store mapping and replication of data structures across data centers.

Briefly stated, key-value stores may be mapped for data structure replication through extraction of file breaks in an existing key-value store by iterating through the store and examining changes in cache addresses to detect jumps in address values. Specially formulated queries may be executed to return the values within an address range that spans a physical storage volume in order to recover full key-value sets that are physically grouped at a current data center including record duplicates. Such sets may be used to replicate or inform the key-value sets at a new location or in a new key-value store allowing construction of a replicated database tree structure complete with record duplications that develop as tables are optimized over time.

FIG. 1 conceptually illustrates a cloud-based data center storing user data across multiple data stores and servers, arranged in accordance with at least some embodiments described herein.

A datacenter is a centralized repository for the storage, management, and dissemination of data and information. A datacenter may exist within an organization's facilities or may be maintained as a specialized facility. Some datacenters may be synonymous with network operations centers (NOCs) containing automated systems that monitor server activity, web traffic, manage data, and network performance. Other datacenters may be specialized on managing collected data. While datacenters are typically associated with a physical entity (e.g., a server room, a server farm, etc.), datacenters may be configured as Virtual Datacenters (VDCs) as well, where managed data is compartmentalized based on size, owner, or other aspects through virtual servers and data stores.

Referring to a diagram 100 of FIG. 1, a datacenter 104 may store data for a multiple number of users (clients) such as a user 102. The user 102 may interact with the datacenter 104 over one or more networks 106 (e.g., cloud-based interaction). User data may be stored in a distributed fashion over multiple data stores such as data stores 112 and 114. The physical distribution of user data is managed through a key-value store 108. The key-value store 108 may include hidden layers. User data tables may be split across many machines and have multiple levels of metadata trees above each table to find the location of each key-value. Furthermore, the key-value store 108 may be accessible to the user 102 through API calls, where users or user executed applications can provide keys or matching terms and retrieve the values.

Metadata trees and physical file extents are not revealed to users of service based key-value stores because these store files are typically complex with duplications, distributed file blocks, and obsolete data. The duplications may often be on purpose in order to allow service robustness and performance, while the obsolete data is due to delayed garbage collection and cleanup (for load balancing). Cloud services may abstract those issues away by giving the user 102 access only by requesting values through APIs. Matching database performance, however, may require intelligent replication of tree structure and record duplication which has been optimized over time based on use—and that is associated with replication of the physical data groupings. Once a new data center has copies of the physical data groupings it can build its own trees containing the shape optimizations and duplications that have developed over time at the previous data center.

Figure 2:
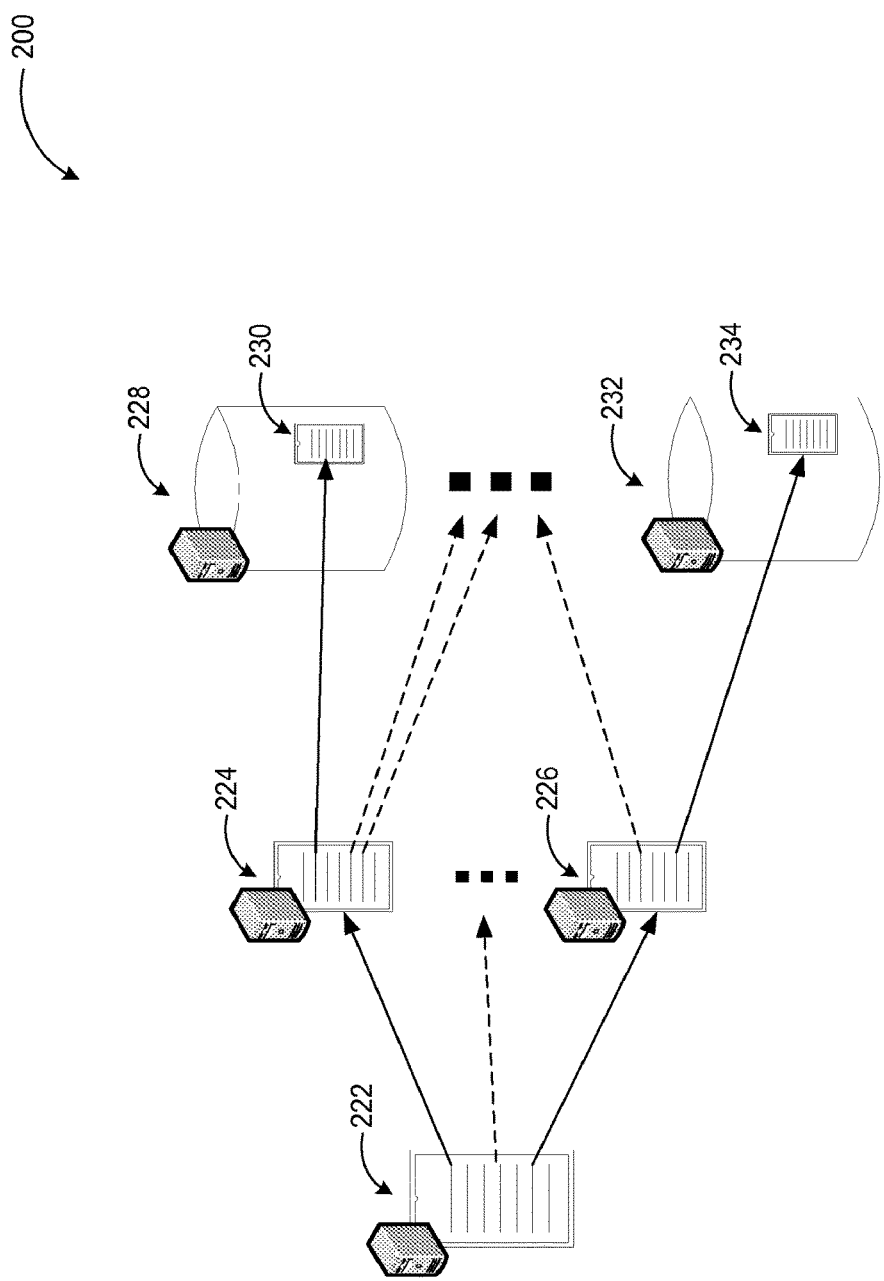
FIG. 2 illustrates use of extracted data tables and a root table for preserving stored data location information in a key-value store.

FIG. 2 illustrates use of extracted data tables and a root table for preserving stored data location information in a key-value store, arranged in accordance with at least some embodiments described herein.

A diagram 200 of FIG. 2 shows an example key-value store showing the hidden layers. User data tables 230, 234 may be split across many machines/stores 228, 232 and have multiple levels of metadata trees (metadata tables 224, 226 and root table 222) above them. User data tables 230, 234, metadata tables 224, 226, and root table 222 may be used to find the location of each key-value. The key-value stores are typically proprietary and are accessed by the user through API calls in which users can provide keys or matching terms and retrieve the values, the actual structure of the metadata tables 224, 226 or the user data tables 230, 234 is not visible to the user, although it needs to be replicated at a destination data center—preferably including duplicate records and other hidden properties—if database performance is to be maintained.

Some embodiments are directed to extraction of true user tables (that are typically abstracted by the interface of datacenter) in key-value systems that use caches. When a key-value is called, the system maintains caches of its location due to the likelihood of it being called again. These caches are commonly not shown to the user through the API (they are held within the abstracted service). However, if a call returns more records than the service can deliver at one time, there are two caches—one for the returned data, and one that provides the location of the next record so that a query can be continued for more data—and the latter cache location is detectable to the user so that they can continue their query from where it left off.

A system according to embodiments employs this "next item cache", also referred to as the NextToken, by setting the maximum returned items list to a length of a predefined short sample length (e.g., 1) and issuing a series of queries while saving the next item cache values. Such values are typically used without observation and the contents are not supposed to have meaning beyond continuing a query. A typical query may be designed to return a preset number of values and a next item cache (e.g., NextToken). In such situations, the tokens may indeed appear random as they often cross file and disk boundaries.

The nature of the next item cache as a storage address reveals itself in the fact that queries using next item caches remove duplicates within a single query but not between returns of multiple queries using next item caches—as each such query is on a discrete storage segment (which may cross physical boundaries) and removing duplicates between them may impact performance.

Figure 3:
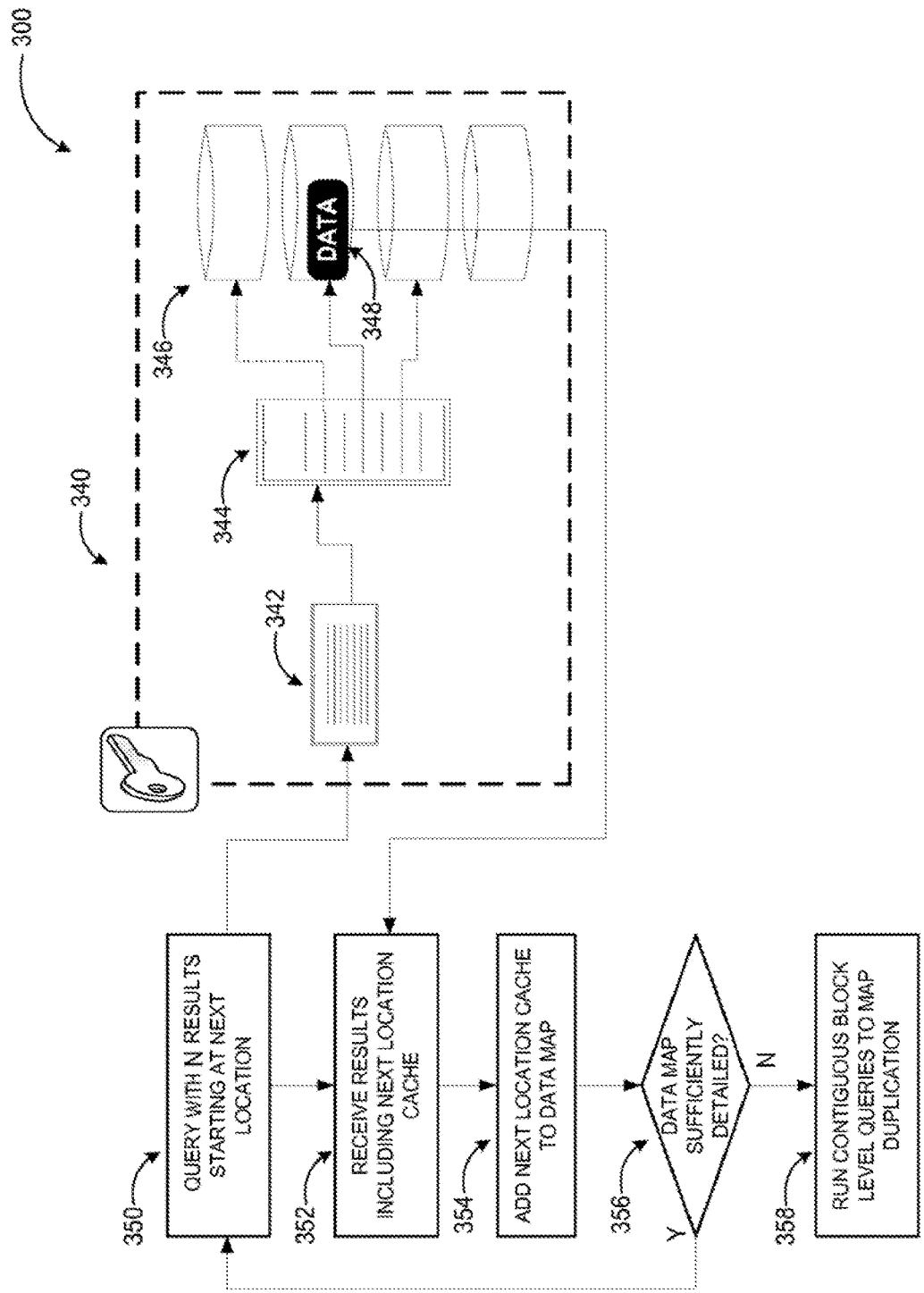
FIG. 3 illustrates how a physical data storage distribution may be mapped using data query caches.

FIG. 3 illustrates how a physical data storage distribution may be mapped using data query caches, arranged in accordance with at least some embodiments described herein.

The nature of next item cache in providing data locations may be employed by an algorithm or technique that submits successive queries with a limited data request along with next item cache values (e.g., returns of single values). Once relative data storage locations are extracted, the data divisions and the data duplication within a target datacenter may be mapped so that data can be replicated to similar structures in a new datacenter.

Referring to a diagram 300 of FIG. 3, mapping physical storage distribution through data query caches on a key-value store 340 is shown. The service provider key-value store 340 may include service provider extracted data tables 342 and 344 that are not directly accessible to a user and a physical storage distribution 346 that is also not known, but which needs to be known so that the user can replicate it at a new datacenter. The process of determining physical storage distribution through queries may begin with issuing a query set with a certain number (N) results 350 on data 348. N may be as few as one to allow record by record mapping and providing the most detail. In other embodiments, N may be higher, such as 100 or 1,000 and the differences in the average address increment may be examined to estimate which groups of N contain breaks in the contiguous physical storage and then those areas may be examined in greater detail.

Regardless of the search design, the algorithm may receive results including a location cache element 352 and add the location cache data to a data map 354. The data map may then be compared against the detail needed for replication 356. If further data is needed, a successive query may be issued starting at next location 350. If the map is sufficiently detailed, contiguous block level queries may be executed or synthesized from previous results 358, to uncover duplication between physical storage blocks.

A number of approaches may be used to design the queries. Larger queries may produce less certain results, but in many cases can still detect where the storage boundaries are. For example, if searching millions of records, analysis at the thousand record granularity may be sufficient to find a dozen or so boundaries in storage as the queries spanning those boundaries may have larger leaps in address space between returned next item cache values. Then, the queries of a thousand records each, which include storage boundaries, may be queried at finer and finer granularity to narrow down the location of boundaries in the user table storage. The certainty of the location of these discontinuities may get finer over time (for example, first to within a 1,000 record range, then 100, then 10, then the exact record) and the data map may be compared against predefined accuracy metrics.

If a query is broken down into multiple storage queries by using a next item cache as a start point for the next query, for example, duplicates are not seen within each query but recurring records may be detected between queries. This is a fairly fundamental characteristic of the distributed nature of the physical storage distribution 346. This characteristic may be used to map records that the system has duplicated over time for optimization such as frequently used data. If the user only needs to know which physical storage elements have copies of each record, a "select response" with matching to "*" (everything) type operation may be used with the start location set to the next item value that has been previously mapped to start a physical storage block and a record count set to match the size of the physical storage that has been mapped. Once such a select operation is completed on each storage block, the list of records on each physical storage block including the presence of multiple instances of records that currently appear on multiple storage blocks may be obtained. This allows one to detect optimizations such as repeated occurrences of frequently used records across multiple tables of user values.

If running contiguous block level queries does not capture all duplicate records (e.g., there may be duplication within storage blocks), a record-by-record query return may be used to gather the most detailed data. If this method is desired, then N may be set to one and operations 350 through 356 looped until the entire database is transited. The contiguous block level queries can be composed synthetically from the records gathered during that looping and the result may be a detailed map of the current data storage arrangement including all dead regions (likely from invalidated records that may not clear until a rebuild) and many-fold copied records.

Once the data storage arrangement has been determined at the existing datacenter, it can be replicated at the destination datacenter by arranging the records similarly within the key-value system used at the destination datacenter. When trees (such as hash trees, Merkle trees, Tiger trees, B trees, or the like) are built to map those records, they may have similar branch and leaf and many-fold coverage to the datacenter that is being replicated. This may enhance the similarity of data store performance, including complex optimizations that may have been performed at the originating datacenter based on operational observations.

While embodiments have been discussed above using specific examples, components, and configurations in FIGS. 1 through 3, they are intended to provide a general guideline to be used for enabling cache based key-value store mapping and replication. These examples do not constitute a limitation on the embodiments, which may be implemented using other components, modules, and configurations using the principles described herein. For example, any suitable special purpose or general purpose computing device may be used for submitting queries to the datacenter key-value store for mapping data storage structure. Furthermore, actions discussed above may be performed in various orders, especially in an interlaced fashion.

Figure 4:
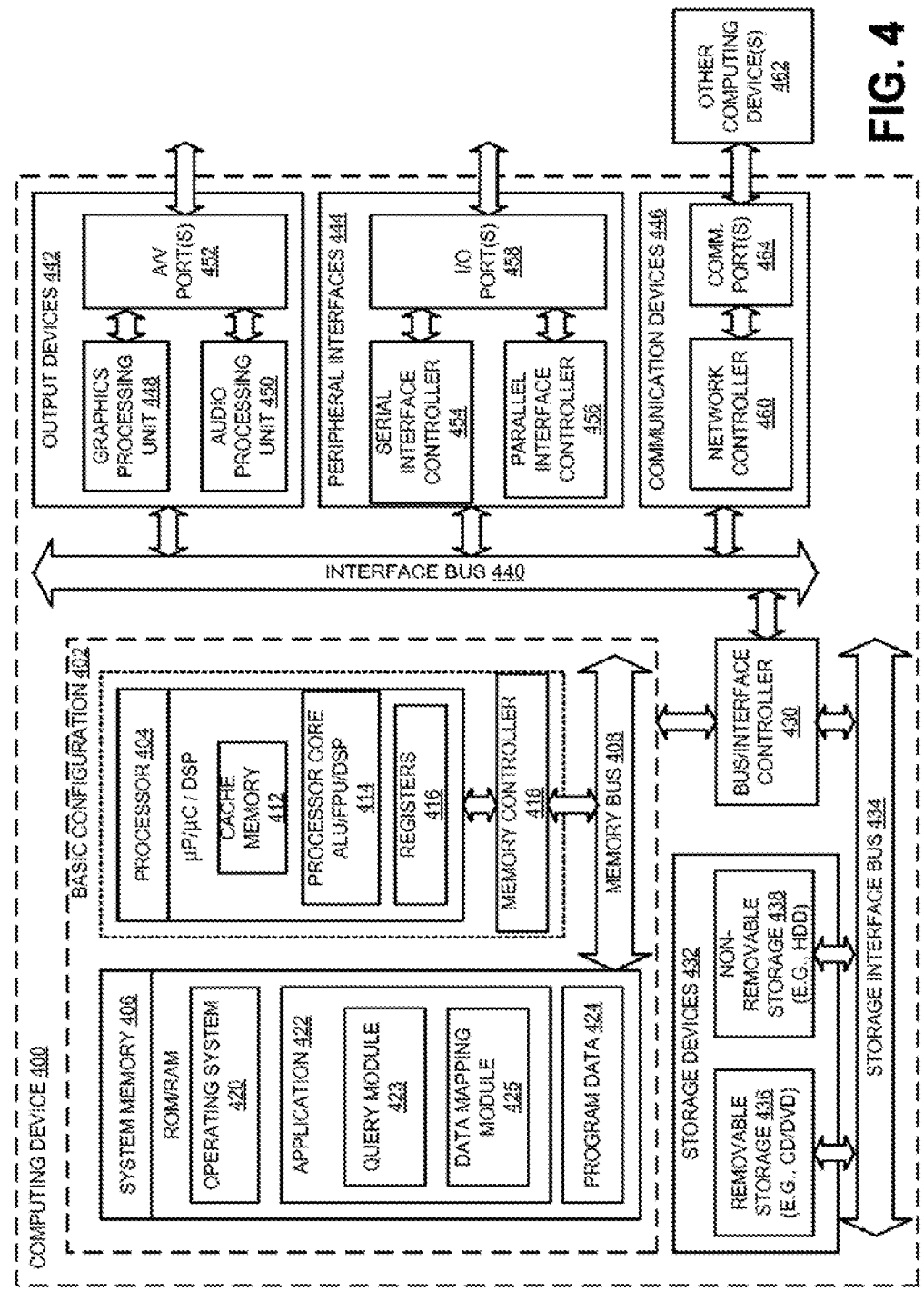
FIG. 4 illustrates a general purpose computing device, which may be used for cache based key-value store mapping.

FIG. 4 illustrates a general purpose computing device, which may be used for cache based key-value store mapping, arranged in accordance with at least some embodiments described herein. In a very basic configuration 402, a computing device 400 typically includes one or more processors 404 and a system memory 406. A memory bus 408 may be used for communicating between the processor 404 and the system memory 406.

Depending on the desired configuration, the processor 404 may be of any type including but not limited to a microprocessor (μP), a microcontroller (μC), a digital signal processor (DSP), or any combination thereof. The processor 404 may include one or more levels of caching, such as a cache memory 412, a processor core 414, and registers 416. The example processor core 414 may include an arithmetic logic unit (ALU), a floating point unit (FPU), a digital signal processing core (DSP core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The applications 422 may include query module 423 and data mapping module 425, which may enable submittal of malformed queries to a datacenter key-value store and map data storage structure at the datacenter based on return values for replication of the data to another datacenter as described herein. The program data 424 may include, among other data, control parameters 428 associated with limiting delivery of analysis results to data use clients. This described the basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via bus/interface controller 430. Some example output devices 442 include a graphics processing unit 448 and an audio processing unit 450, which may be configured to communicate to various external devices such as a display or speakers via one or more AN ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
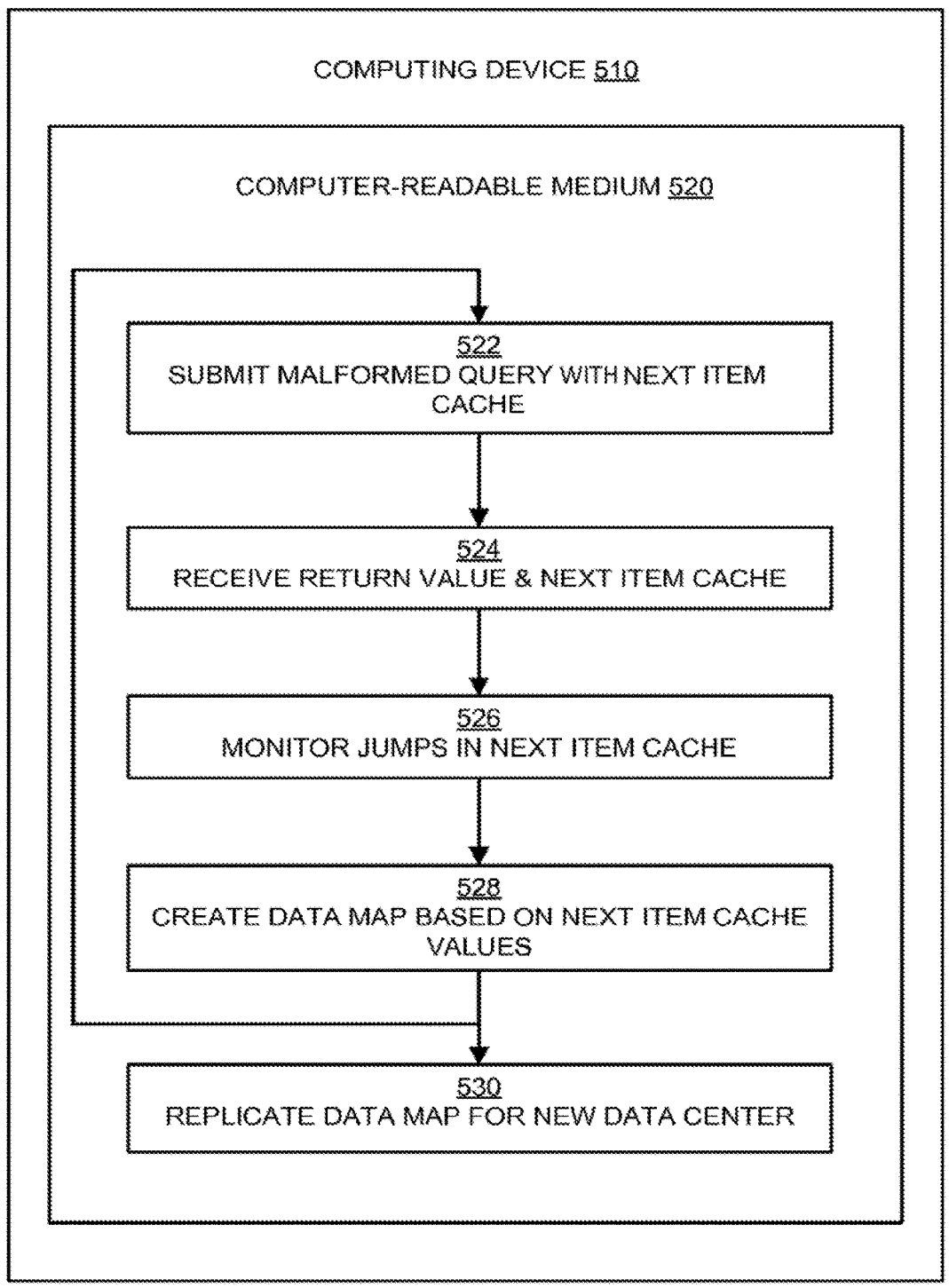
FIG. 5 is a flow diagram illustrating an example method for cache based key-value store mapping and replication that may be performed by a computing device such as the device in FIG. 4.

FIG. 5 is a flow diagram illustrating an example method for cache based key-value store mapping and replication that may be performed by a computing device such as the device in FIG. 4, arranged in accordance with at least some embodiments described herein. Example methods may include one or more operations, functions or actions as illustrated by one or more of blocks 522, 524, 526, and/or 528. The operations described in blocks 522 through 528 may also be stored as computer-executable instructions in a computer-readable medium such as a computer-readable medium 520 of a computing device 510.

A process of for cache based key-value store mapping and replication may begin at block 522, "SUBMIT MALFORMED QUERY WITH NEXT ITEM CACHE". At block 522, a client device such as a computing device for the user 102 of FIG. 1 may submit a query to a datacenter key-value store asking for a predefined number of results with a location cache element (NextToken). Malformation may also take the form of an abnormally small number of results for a broad query, a query that returns the whole data store, or an error generating query.

Block 522 may be followed by block 524, "RECEIVE RETURN VALUE AND NEXT ITEM CACHE." At block 524, results of the submitted query are received at the client device for the user 102 along with the location cache element. Block 524 may be followed by block 526, "MONITOR JUMPS IN NEXT ITEM CACHE." At block 526, the data mapping module 425 of the client device may monitor and examine changes in cache addresses to detect jumps in address values.

Block 526 may be followed by block 528, "CREATE DATA MAP BASED ON NEXT ITEM CACHE VALUES." At block 528, the data mapping module 425 of the client device may add the location cache element to a data map for mapping data divisions and data duplication within the target data center. For example, the data map may be created by grouping entries into multiple columns based on unusually long next item cache steps that may indicate a change in physical storage grouping. If the map is sufficiently detailed, the data mapping module 425 may issue contiguous block level queries or synthesize the contiguous block level queries from previous results to uncover duplication between physical storage blocks. The process may be iteratively repeated until the entire data storage structure is mapped. Block 528 may be followed by block 530, "REPLICATE DATA MAP FOR NEW DATA CENTER." At block 530, the application 422 or another application at the client device may replicate the data storage structure at the target datacenter to another datacenter, where the data is being moved to.

The functions performed at the blocks in the above described process are for illustration purposes. Key-value store mapping and data storage structure replication based on query caches may be implemented by similar processes with fewer or additional functions. In some examples, the functions may be performed in a different order. In some other examples, various functions may be eliminated. In still other examples, various functions may be divided into additional functions, or combined together into fewer functions.

Figure 6:
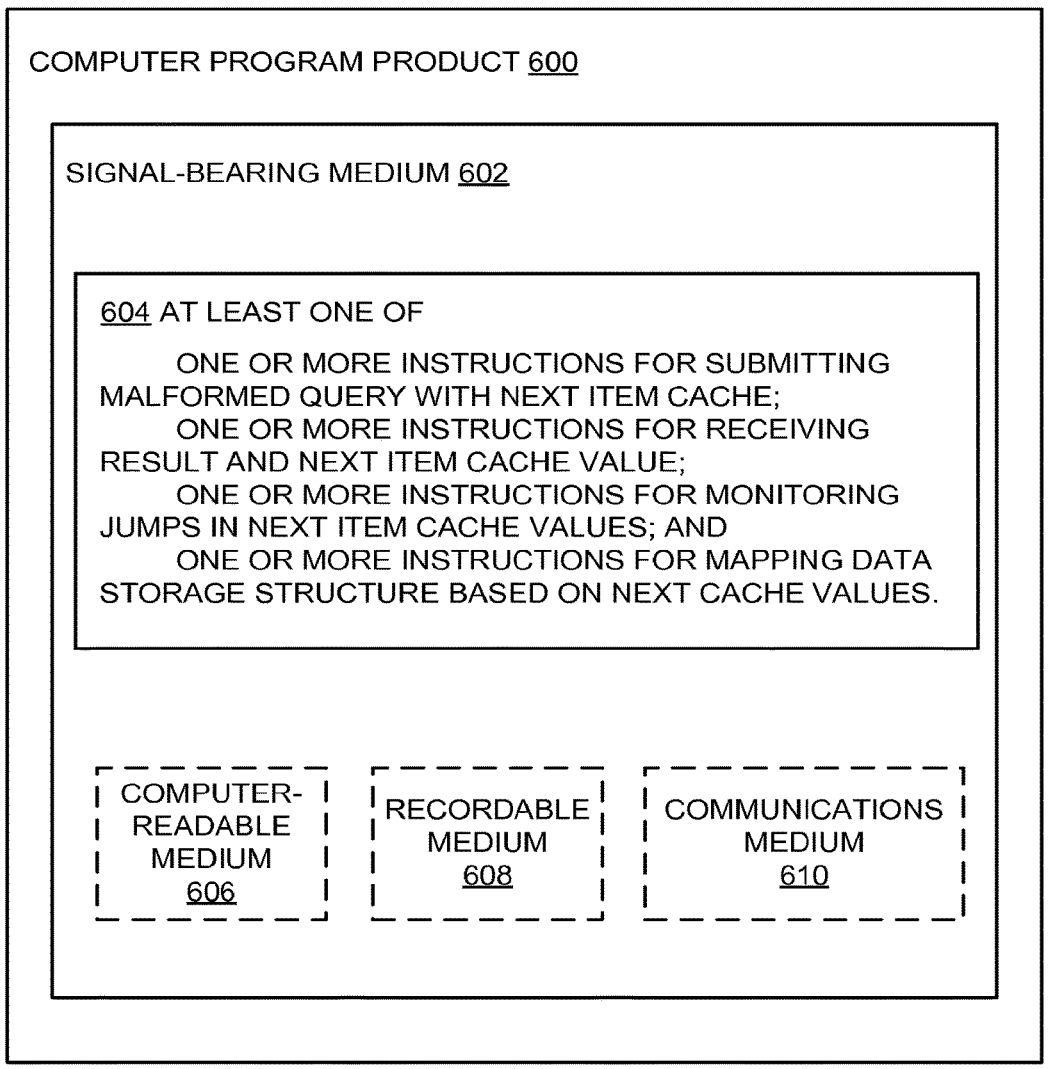
FIG. 6 illustrates a block diagram of an example computer program product, all arranged in accordance with at least some embodiments described herein.

FIG. 6 illustrates a block diagram of an example computer program product, arranged in accordance with at least some embodiments described herein. In some examples, as shown in FIG. 6, the computer program product 600 may include a signal bearing medium 602 that may also include machine readable instructions 604 that, when executed by, for example, a processor, may provide the functionality described above with respect to FIG. 4. Thus, for example, referring to the processor 404, the data mapping module 425 may undertake one or more of the tasks shown in FIG. 6 in response to the instructions 604 conveyed to the processor 504 by the signal bearing medium 602 to perform actions associated with submitting malformed query with next item cache, receiving results and next item cache value, monitoring jumps in next item cache values, and mapping data storage structure based on the next item cache values.

In some implementations, the signal bearing medium 602 depicted in FIG. 6 may encompass a computer-readable medium 606, such as, but not limited to, a hard disk drive (HDD), a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, the computer program product 600 may be conveyed to one or more modules of the processor 604 by an RF signal bearing medium, where the signal bearing medium 602 is conveyed by the wireless communications medium 610 (e.g., a wireless communications medium conforming with the IEEE 802.11 standard).

According to some examples, a method for key-value store mapping and replication may include mapping physical storage distribution within a target data center by extracting relative data storage locations employing data query caches from a key-value store of the target data center and mapping data divisions and data duplication within the target data center. The method may also include replicating data within the target data center to similar structures in a new data center.

The key-value store may include extracted data tables that are not directly accessible to a user. According to other examples, the method may further include issuing a query set with a predefined number of results, receiving the results including a location cache element, adding the location cache element to a data map, and comparing the data map against a detail needed for the replication. If the map is sufficiently detailed, contiguous block level queries may be issued or the contiguous block level queries may be synthesized from previous results to uncover duplication between physical storage blocks. If the map is not sufficiently detailed, a new query may be issued.

The predefined number may be dependent on a stored data size. The predefined number may be one to allow highest detail. If a step between sequential request addresses is bigger than one of about one storage block or about one page, differences in average address increments may be scanned to estimate which groups include breaks in contiguous physical storage and the groups that include breaks in contiguous physical storage examined to determine physical data storage structure in higher detail. Replicating data to similar structures in a new data center may include arranging records similarly within a key-value system used at the new data center. The method may also include constructing one or more tree structures to map the data such that the one or more tree structures have substantially similar branch and leaf and many-fold coverage to the data center that is being replicated. The tree structures may include one or more of hash trees, Merkle trees, Tiger trees, and B trees.

According to further examples, a computing device adapted to perform key-value store mapping and replication may include a memory and a processor coupled to the memory. The processor may execute a data transfer application, which may map physical storage distribution within a target data center by extracting relative data storage locations employing data query caches from a key-value store of the target data center, map data divisions and data duplication within the target data center, and replicate data within the target data center to similar structures in a new data center.

The key-value store may include extracted data tables that are not directly accessible to a user. According to other examples, the data transfer application may further perform one or more of: issuing a query set with a predefined number of results, receiving the results including a location cache element, adding the location cache element to a data map, and comparing the data map against a detail needed for the replication. If the map is sufficiently detailed, contiguous block level queries may be issued or the contiguous block level queries may be synthesized from previous results to uncover duplication between physical storage blocks. If the map is not sufficiently detailed, a new query may be issued.

The predefined number may be dependent on a stored data size. The predefined number may be one to allow highest detail. If a step between sequential request addresses is bigger than one of about one storage block or about one page, differences in average address increments may be scanned to estimate which groups include breaks in contiguous physical storage and the groups that include breaks in contiguous physical storage examined to determine physical data storage structure in higher detail. Replicating data to similar structures in a new data center may include arranging records similarly within a key-value system used at the new data center. The data transfer application may also construct one or more tree structures to map the data such that the one or more tree structures have substantially similar branch and leaf and many-fold coverage to the data center that is being replicated. The tree structures may include one or more of hash trees, Merkle trees, Tiger trees, and B trees.

According to yet other examples, a computer-readable storage medium may have instructions stored thereon for key-value store mapping and replication. The instructions may include mapping physical storage distribution within a target data center by extracting relative data storage locations employing data query caches from a key-value store of the target data center; mapping data divisions and data duplication within the target data center; and replicating data within the target data center to similar structures in a new data center.

The key-value store may include extracted data tables that are not directly accessible to a user. According to other examples, the instructions may further include issuing a query set with a predefined number of results, receiving the results including a location cache element, adding the location cache element to a data map, and comparing the data map against a detail needed for the replication. If the map is sufficiently detailed, contiguous block level queries may be issued or the contiguous block level queries may be synthesized from previous results to uncover duplication between physical storage blocks. If the map is not sufficiently detailed, a new query may be issued.

The predefined number may be dependent on a stored data size. The predefined number may be one to allow highest detail. If a step between sequential request addresses is bigger than one of about one storage block or about one page, differences in average address increments may be scanned to estimate which groups include breaks in contiguous physical storage and the groups that include breaks in contiguous physical storage examined to determine physical data storage structure in higher detail. Examining in higher detail may include changing the predefined number. Replicating data to similar structures in a new data center may include arranging records similarly within a key-value system used at the new data center. The instructions may also include constructing one or more tree structures to map the data such that the one or more tree structures have substantially similar branch and leaf and many-fold coverage to the data center that is being replicated. The tree structures may include one or more of hash trees, Merkle trees, Tiger trees, and B trees.

According to some examples, a server adapted to perform key-value store mapping and replication may include a memory and a processor coupled to the memory. The processor may execute a data transfer application, which may be configured to extract file breaks in an existing key-value store of a target data center by iteratively submitting a query requesting a predefined number of results and a location cache element to the key-value store of the target data center; receive return values within an address range that spans a physical storage volume; and recover key-value sets and record duplicates that are physically grouped at the target data center.

According to other examples, the data transfer application may further replicate the key-value sets at a key-value store of a new data center. The location cache element may be a NextToken and the predefined number is one to allow highest detail.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed on a computing device for key-value store mapping for data structure replication through an extraction of file breaks in a key-value store, the method comprising:
   mapping a distribution of a physical storage within a target data center by an extraction of relative data storage locations that employ data query caches from a key-value store of the target data center through:
      receiving a number of query set results, wherein the number of the query set results include a location cache element; and
      adding the location cache element to a data map, wherein the location cache element includes a NextToken arranged to remove duplicate records within a single query and returns address values within a range of cache addresses that spans a volume of the physical storage within the target data center to recover key-value sets that are physically grouped in a current location, and wherein the key-value store includes a metadata table and a root table to recover the current location of the key-value sets;
   iterating through the key-value store to:
      identify a step larger than one storage block in the range of the cache addresses which are sequential;
      scan differences in the range of the sequential cache addresses to estimate a group of the query set results that include breaks in the physical storage; and
      examine the breaks to elucidate a structure of the physical storage;
   mapping data divisions and data duplication within the target data center by a comparison of the data map against a detail utilized by the data structure replication, wherein the number of query set results provide the detail;
   issuing a record-by-record query to gather data from a previous query set that results in a new data map of the query set in response to a determination that the data map is sufficiently detailed and that a duplication exists between blocks in the physical storage, wherein the record-by-record query includes replicated data and regions from invalidated data query sets;
   replicating the data within the target data center to similar structures in a new data center by arranging the data similarly within a key-value system used at the new data center; and
   constructing one or more tree structures in the new data center, wherein the one or more tree structures include Merkle trees and Tiger trees.

2. The method according to claim 1, wherein the key-value store further includes extracted data tables that are not directly accessible to a user.

3. The method according to claim 1, further comprising:
   in response to the determination that the data map is sufficiently detailed, one of issuing contiguous block level queries and synthesizing the contiguous block level queries from previous results to uncover the duplication between the blocks in the physical storage.

4. The method according to claim 1, further comprising:
   in response to a determination that the data map is not sufficiently detailed, issuing a new query.

5. The method according to claim 1, wherein the number of the query set results is dependent on a stored data size.

6. The method according to claim 1, wherein the number of the query set results is one to allow highest detail.

7. A computing device adapted to perform key-value store mapping for data structure replication through an extraction of file breaks in a key-value store, the computing device comprising:
   a memory; and
   a processor coupled to the memory, wherein the processor is operable to execute a data transfer application stored in the memory, and wherein the data transfer application is configured to:
      receive a number of query set results that include a location cache element;
      add the location cache element to a data map, wherein the location cache element includes a NextToken arranged to remove duplicate records within a single query and returns address values within a range of cache addresses that span a volume of a physical storage in a target data center to recover key-value sets that are physically grouped in a current location, and wherein the key-value store includes a metadata table and a root table to recover the current location of the key-value sets,
      iterate through the key-value store to:
         identify a step larger than one storage block in the range of the cache addresses which are sequential;
         scan differences in the range of the sequential cache addresses to estimate a group of the query set results that include breaks in the physical storage, and
         examine the breaks to elucidate a structure of the physical storage;
      map data divisions and data duplication within the target data center by a comparison of the data map against a detail utilized by the data structure replication to map data divisions and data duplication within the target data center, wherein the number of query set results provides the detail;
      issue a record-by-record query to gather data from a previous query set that results in a new data map of the query set in response to a determination that the data map is sufficiently detailed and that a duplication exists between blocks in the physical storage, wherein the record-by-record query includes replicated data and regions from invalidated data query sets;
      replicate data within the target data center to similar structures in a new data center by arrangement of the data similarly within a key-value system used at the new data center; and
      construct one or more tree structures in the new data center, wherein the one or more tree structures include Merkle trees and Tiger trees.

8. The computing device according to claim 7, wherein the data transfer application is further configured to:
   in response to the determination that the data map is sufficiently detailed, one of issue contiguous block level queries and synthesize the contiguous block level queries from previous results to uncover duplication between the blocks in the physical storage; and
   in response to a determination that the data map is not sufficiently detailed, issue a new query.

9. The computing device according to claim 7, wherein the one or more tree structures further include hash trees.

10. A computer-readable storage medium having instructions stored thereon for key-value store mapping for data structure replication through an extraction of file breaks in a key-value store, the instructions being executable by at least one processor to perform or cause to be performed operations comprising:

mapping a distribution of a physical storage within a target data center by an extraction of relative data storage locations that employ data query caches from a key-value store of the target data center through:
identifying a number of query set results that include a location cache element;
adding the location cache element to a data map, wherein the location cache element includes a Next-Token arranged to remove duplicate records within a single query and returns address values within a range of cache addresses that spans a volume of the physical storage within the target data center to recover key-value sets that are physically grouped in a current location, and wherein the key-value store includes a metadata table and a root table to recover the current location of the key-value sets;
iterating through the key-value store to:
identify a step larger than one storage block in the range of the cache addresses which are sequential;
scan differences in the range of the sequential cache addresses to estimate a group of the query set results that include breaks in the physical storage; and
examine the breaks to elucidate a structure of the physical storage;
mapping data divisions and data duplication within the target data center by a comparison of the data map against a detail utilized by the data structure replication, wherein the number of query set results provides the detail;
issuing a record-by-record query to gather data from a previous query set that results in a new data map of the query set in response to a determination that the data map is sufficiently detailed and that a duplication exists between physical storage, wherein the record-by-record query includes replicated data and regions from invalidated data query sets;
replicating data within the target data center to similar structures in a new data center by arranging the data similarly within a key-value system used at the new data center; and
constructing one or more tree structures in the new data center, wherein the one or more tree structures include Merkle trees and Tiger trees.

11. The computer-readable storage medium according to claim 10, wherein the instructions are executable by the at least one processor to perform or cause to be performed operations that further comprise:
in response to the determination that the data map is sufficiently detailed, one of issuing contiguous block level queries and synthesizing the contiguous block level queries from previous results to uncover the duplication between the blocks in the physical storage; and
in response to a determination that the data map is not sufficiently detailed, issuing a new query.

12. A server adapted to perform key-value store mapping for data structure replication through an extraction of file breaks in a key-value store, the server comprising:
a memory; and
a processor coupled to the memory, the processor configured to execute a data transfer application stored in the memory, wherein the data transfer application is configured to:
iterate through the key-value store to:
identify a step larger than one storage block in a range of cache addresses which are sequential;
scan differences in the range of the sequential cache addresses to estimate a group of query set results that include breaks in physical storage of a target data center;
examine the breaks to elucidate a structure of the physical storage of the target data center; and
receive return values within the range of cache addresses that spans a volume of the physical storage;
recover key-value sets and record duplicates that are physically grouped at the target data center by:
addition of a location cache element to a data map, wherein the location cache element includes a NextToken arranged to remove a duplicate record within a query and returns address values within the range of cache addresses that spans the volume of the physical storage to recover the key-value sets that are physically grouped in a current location, and wherein the key-value store includes a metadata table and a root table to recover the current location of the key-value sets; and
comparison of the data map against a detail utilized by the data structure replication, wherein a number of the query set results provide the detail;
issue a record-by-record query to gather data from a previous query set that results in a new data map of the query set in response to a determination that the data map is sufficiently detailed and that a duplication exists between blocks in the physical storage, wherein the record-by-record query includes replicated data and regions from invalidated data query sets;
replicate the key-value sets within the target data center to similar structures in a new data center by arranging the data similarly within a key-value system used at the new data center; and
construct one or more tree structures in the new data center, wherein the one or more tree structures include Merkle trees, and Tiger trees.

13. The server according to claim 12, wherein the number of the query set results is one to allow highest detail.

* * * * *

UNITED STATES PATENT AND TRADEMARK OFFICE
CERTIFICATE OF CORRECTION

PATENT NO. : 9,836,514 B2  
APPLICATION NO. : 13/502312  
DATED : December 5, 2017  
INVENTOR(S) : Kruglick Page 1 of 1

It is certified that error appears in the above-identified patent and that said Letters Patent is hereby corrected as shown below:

In the Specification

In Column 7, Line 54, delete "AN ports" and insert -- A/V ports --, therefor.

In the Claims

In Column 16, Line 22, in Claim 7, delete "sets," and insert -- sets; --, therefor.

In Column 16, Line 28, in Claim 7, delete "storage," and insert -- storage; --, therefor.

Signed and Sealed this
Seventeenth Day of April, 2018

Andrei Iancu
*Director of the United States Patent and Trademark Office*